United States Patent [19]

Kakishita et al.

[11] Patent Number: 5,487,947
[45] Date of Patent: Jan. 30, 1996

[54] WATER SOLUBLE COMPOSITE FILM

[75] Inventors: Osamu Kakishita; Jun Nishioka, both of Nagahama; Takeshi Fujita, Uji; Katsuaki Matsuo, Kyoto, all of Japan

[73] Assignees: Dai-Ichi Kogyo Seiyaku Co., Ltd., Kyoto; Mitsubishi Plastics, Inc., Tokyo, both of Japan

[21] Appl. No.: 282,538

[22] Filed: Jul. 29, 1994

[30] Foreign Application Priority Data

Aug. 3, 1993 [JP] Japan .................................. 5-192439

[51] Int. Cl.$^6$ .................... B32B 27/30; B32B 27/36; B32B 27/40
[52] U.S. Cl. .................... 428/424.4; 428/35.2; 428/35.4; 428/36.6; 428/36.7; 428/424.2; 428/483
[58] Field of Search .................... 428/424.4, 424.2, 428/480, 483, 35.2, 35.4, 36.6, 36.7

[56] References Cited

U.S. PATENT DOCUMENTS 5,047,272 9/1991 Hassel et al. ........................... 428/40

Primary Examiner—D. S. Nakarani
Attorney, Agent, or Firm—Armstrong, Westerman Hattori, McLeland & Naughton

[57] ABSTRACT

A water-soluble composite film including a special film mainly made of water soluble high molecular compound composed of a specific repetitive unit and a polyvinyl alcohol resin film layered thereon to be laminated. This composite film can be used as a packaging material for chemicals and the like with the above special film inside. Thus, this water soluble composite film can be employed as a unit package material for bactericide, insecticide, dyestuff, pesticide and the like, or as a packaging material for disposable commodities of laundry bags, sanitary napkins and the like.

4 Claims, No Drawings

WATER SOLUBLE COMPOSITE FILM

FIELD OF THE INVENTION

The present invention relates to a water soluble composite film, which is used for packaging materials of various articles, medical supplies and the like.

BACKGROUND OF THE INVENTION

Polyvinyl alcohol resin (abbreviated as "PVA" hereinafter), polyethylene oxide resin (abbreviated as "PEO" hereinafter), methyl cellulose, hydroxy propyl cellulose, starch and the like have been known heretofore, however, recently water soluble films especially made of PVA have been widely employed.

As specific usage for the above water soluble films of PVA, there are various packaging materials for bactericide, insecticide, dyestuff, pesticide and the like, laundry bags at hospitals, instant wallpaper lining, sanitary napkins and the like.

However, when using the above PVA film as a packaging material, it is necessary to heat seal the PVA film at a relatively high temperature of 150° to 170° C. for sealed packing. There is a problem of insoluble matter caused by the heat seal at such a high temperature. In addition, the fact is that if alkaline substance and the like are packaged therewith, water solubility is reduced, which prohibits employment of PVA as a water soluble film material. In the meantime, it is difficult to obtain a transparent film wherein crystals grow even in thermoplastic moulding or casting because crystallinity of PEO as a forming material is high. Furthermore, it is not easy, due to high melt viscosity, to extrude and mold high molecular type alone, which is high in mechanical strength, in the above thermoplastic moulding. On the other hand, low molecular type, easy for extrusion moulding, has a defect of low mechanical strength and low bending strength. Still furthermore, the above film solely made of PEO has a defect that films adhere to each other by blocking caused during transportation or storage under high temperature atmosphere such as in summer because its melting point is about 65° C., which is relatively low.

OBJECT OF THE INVENTION

The object of this invention is accordingly to provide a water soluble composite film, superior in water solubility, storage stability, and transparency, and also easy to manufacture.

SUMMARY OF THE INVENTION

To accomplish the above object, the water soluble composite film in the present invention comprises a film mainly made of water soluble high molecular compound composed of a repetitive unit represented as a following general formula (1) and a PVA film which is layered and laminated thereon.

$$(A\text{---}X\text{---}A\text{---}R_2)$$

In the above formula (1), A is a unit composed of a repetition of $-(CH_2CH_2O)-$ and

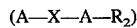

provided that the unit $-(CH_2CH_2O)-$ exists at not less than 70% by weight in A, a repetitive number of $(CH_2CH_2O)$ is a positive number, and a repetitive number of

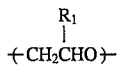

is zero or a positive number. Furthermore, $R_1$ is a hydro carbon group, X is an organic residue of an organic compound having two active hydrogen groups, and $R_2$ is a dicarboxylate compound residue or a diisocyanate compound residue.

That is, the inventors of the present invention have conducted a series of studies to obtain a film superior in water solubility, especially solubility in cold water, storage stability and transparency under high temperature atmosphere, and which is easy to manufacture. As a result, they reached the present invention that the above problem can be solved by layering a special film mainly made of a specific water soluble high molecular compound composed of a repetitive unit represented as the above general formula (1) with a PVA film employed heretofore, to be laminated. Namely, since both of the PVA film and the special film are superior in transparency, the water soluble composite film in this invention is also superior in transparency. It is possible to heat seal the water soluble composite film in this invention at a low temperature, wherein insolubility of PVA films and the like are not caused, by placing the above special film so as to face the heat seal side, because the special film is relatively superior in heat fusibility at a low temperature.

In this case, a temperature for lamination is set at a low temperature, for example, between 70° and 100° C. Therefore, the water soluble composite film in this invention does not cause insolubility and also make use of the advantage of superior water solubilitiy by the above special film, so that the film demonstrates excellent solubility in cold water and the like. Besides, since the above special film is superior in chemical resistance, the water soluble composite film has an advantage that the properties thereof do not change by wrapping chemicals and the like with the special film inside.

It is very easy to manufacture the water soluble composite film in this invention due to its easy process that material resin of the above special film is coated on PVA film. This means that the manufactured film has a two-layer structure and the above special film pile via PVA film in storage by wrapping on a core. Therefore, the PVA film can prevent the special film from adhering each other by fusion. That is, the PVA film gives blocking resistance to the water soluble composite film in this invention. In addition, "mainly made of" in this specification contains the meaning of "solely made of".

The present invention is now described in further detail.

The water soluble composite film comprises at least a two-layer structure of two films as a basic unit of the special film mainly made of a specific water soluble high molecular compound and the PVA film.

The above specific water soluble high molecular compound is composed of a repetitive unit represented as the following general formula (1).

$$\{A\text{---}X\text{---}A\text{---}R_2\}\text{---} \tag{1}$$

In the above formula (1), A is a unit composed of a repetition of
$-(CH_2CH_2O)-$ an

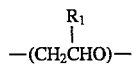

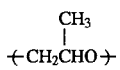

provided that the unit $-(CH_2CH_2O)-$ exists at not less than 70% by weight in A, a repetitive number of $-(CH_2CH_2O)-$ is positive number, and a repetitive number of

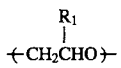

is zero or a positive number. Furthermore, $R_1$ is a hydrocarbon group), X is an organic residue of an organic compound having two active hydrogen groups, and $R_2$ is a dicarboxylate compound residue or a diisocyanate compound residue.

In the above formula (1), $R_1$ is preferably a methyl group, an ethyl group or a phenyl group. The weight average molecular weight of the above water soluble high molecular compound is preferably not less than 50,000, more preferably from 50,000 to 300,000, most preferably from 100,000 to 200,000. Such a specific water soluble high molecular compound can be obtained, for example, by employing the following two ingredients of (A) and (B):

(A) Polyoxy alkylene polyol, whose weight average molecular weight is not less than 1,000, obtained by addition polymerizing alkylene oxide containing ethylene oxide at not less than 70% by weight to an organic compound having two active hydrogen groups and (B) At least one selected among the group consisting of dicarboxylate compound and diisocyanate compound.

As the above organic compound having two active hydrogen groups, there are mainly alicyclic diol such as ethylene glycol, diethylene glycol, propylene glycol, dipropylene glycol, 1,4-butanediol, 1,6-hexanediol, neopentylglycol, bisphenol A, polytetramethylene glycol, cyclohexane-1,4-dimethanol, and amines such as butylamine, octylamine, laurylamine, cyclohexylamine, aniline. These are employed solely or in combination.

As alkylene oxide containing ethylene oxide for addition polymerization to the above organic compound having two active hydrogen groups, there are ethylene oxide solely, alkylene oxide mixture such as propylene oxide, butylene oxide, or styrene oxide containing ethylene oxide at not less than 70% by weight. If the content of the above ethylene oxide is less than 70% by weight, the mixture becomes water insoluble, which is not suitable for the composite film in this invention.

The above (A) can be obtained by employing each of the above ingredient(s), and reacting it/them with caustic alkali such as sodium hydoroxide or potassium hydroxide as a catalyst at a temperature between about 90° and 200 °C. for 2 to 30 hours so as to addition polymerize alkylene oxide containing ethylene oxide to the organic compound having two active hydrogen groups as a block or at random.

The weight average molecular weight of (A), polyoxy alkylene polyol, obtained by employing the above ingredient(s) is not less than 1,000, especially preferably from 5,000 to 30,000. That is, if the weight average molecular weight is less than 1,000, the mixing ratio of the above corresponding (B), the connecting agent of dicarboxylate compound or diisocyanate compound increases so that deterioration of solubility in cold water can be seen. On the other hand, if the weight average molecular weight is between 5,000 and 30,000, the melting point of the water soluble high molecular compound obtained by reacting with the connecting agent of (B) becomes high, and also good film formability.

As dicarboxylate compound of (B), which reacts with the above (A), there are dicarboxylic acid, dicarboxylate anhydride, lower alkyl ester of dicarboxylic acid. As the above dicarboxylic acid, there are phthalic acid, isophthalic acid, terephthalic acid, malonic acid, succinic acid, sebacic acid, maleic acid, fumaric acid, adipic acid, itaconic acid and the like. As the above dicarboxylate anhydride, there is each anhydride of the above various dicarboxylic acids. Finally, as the lower alkyl ester of the above dicarboxylic acid, there are methyl ester, dimethyl ester, ethyl ester, diethyl ester, propyl ester, dipropyl ester and the like of each dicarboxylic acid of the above. These are employed solely or in combination.

As diisocyanate compound of the above (B), specifically, there are tolylenediisocyanate, diphenylmethane diisocyanate, hexamethylene diisocyanate, isophorone diisocyanate, xylene diisocyanate, 4,4-methylene-bis (cyclohexyl isocyanate) and the like.

The water soluble high molecular compound can be obtained by reacting the above (A) and (B) as follows. The first case that (B) is dicarboxylate compound is described. That is, the above (A) is prepared, and the above (B) is added therein.

The mixture of (A) and (B) is heated. Then, dehydration or dealcholization is conducted under heating condition at 80° to 250° C. and reduced pressure into 0.001 to 20 mmHg, resulting in the water soluble high molecular compound. The time for such a reaction is usually 30 minutes to 10 hours.

It is preferable that the mixing ratio (A/B) of both (A) and (B) to be reacted is specifically set within the scope of A/B=1/1.05 to 1/3.50 at equivalent ratio.

Next, another case that the above (B) is diisocyanate compound is described. The reaction to be urethanated in diisocyanate compound is conducted, for example, by mixing polyoxyalkylene polyol and diisocyanate compound within the scope of 0.5 to 1.5 at equivalent ratio of NCO/OH so as to be reacted at a temperature of 80° to 150° C. for 1 to 5 hours.

The weight average molecular weight of thus obtained water soluble high molecular compound is preferably set at not less than 50,000, more preferably 50,000 to 300,000, especially preferably 100,000 to 200,000, as mentioned above.

If the weight average molecular weight is less than 50,000, solubility velocity into water is great, however it is difficult to fit mechanical strength and formability of the obtained film to desirable conditions and also difficult to satisfy conditions of various usage. On the other hand, if the weight average molecular weight is over 300,000, there is a tendency that film forming by melting becomes difficult due to increased melt viscosity. Moreover, this water soluble high molecular compound contains ethylene oxide chain at not less than 70%, resulting in water solubility.

Furthermore, when forming the film with the above water soluble high molecular compound, if necessary, thermostable agent, antioxidant or ultraviolet absorption agent can be added appropriately in order to prevent heat deterioration in processing to form a film, ultraviolet deterioration or ozone deterioration in storing. Still furthermore, if transparency is not required, in addition to the above additive, mineral filler such as carbon, titanium oxide and the like can be added within the scope of 3 to 20 weight parts (as referred as part(s) hereinafter) of the entire material, mainly composed of the water soluble high molecular compound, for forming the film so as to form an opaque film.

As materials for PVA film to be layered and laminated with the above special film, any conventional known type of partially saponified PVA soluble in cold water can be employed, which is not critical. In this invention, the purpose of employing PVA is to prevent blocking without deteriorating solubility at a low temperature. PVA itself serves as blocking resistance as mentioned above, PVA especially whose molecular weight is not more than 100,000 is preferable to prevent from decreasing solubility at a low temperature. Plasticizer, filler, reinforcer, colorant or the like can be mixed appropriately into the PVA film in this invention within the scope so as not to deteriorate solubility at a low temperature.

The water soluble composite film in this invention can be manufactured, for example, by roughly two methods as follows. The first method is to layer the PVA film and the film mainly made of a specific water soluble high molecular compound, each which is formed individually. That is, PVA films can be manufactured in a conventional and known method (casting, extrusion and the like) by employing the above materials for PVA films. On the other hand, the special film can be manufactured in a conventional method, for example, solution casting method, fusion extrusion with T-die or inflation, or calendering method by employing the forming materials mainly made of the specific water soluble high molecular compound. Subsequently, the above two films are heat-pressing laminated at a low temperature, for example, 70° to 100° C. so as to form the film. The second method is to manufacture the PVA film in advance, and to fusion extrude the above materials for the special film on the film side of this PVA so as to form the composite film, or to make the composite film on the film side of the above PVA film by casting resin solution for the above special film. Taking the actual production into consideration, the above fusion extrusion, calendering method or fusion extrusion on the PVA film to form composite film is preferable. In addition, it is possible to layer them by partial adhesion, if necessary.

In the above water soluble composite film, the thickness of each film is not critical, and depends on the purpose and application field, however, since the PVA film is aimed at, for example, blocking and thinner is more desirable, preferably not more than 25 µm (abbreviated as µ hereinafter). That is, if the thickness is over 25µ, water solubility deteriorates greatly. Furthermore, since the special film is superior in water solubility, it is desirable that the film thickness is thicken in applying into the usage which requires high strength and excellent chemical resistance. Specifically, the thickness of the film can be selected based upon the degree of film strength, chemical resistance and water solubility, usually, 5 to 200µ is preferable, 20 to 100µ is more preferable, and 30 to 60µ is most preferable.

The water soluble composite film in this invention is provided with the above PVA film and the special film. For example, when manufacturing a bag with a water soluble composite film as a package material, it is preferable to put the PVA film outside and put the special film inside. In this case, only if the package is basically provided with the above structure, not to mention two-layer structure, multilayer structure of three layers or more is acceptable. Thus, placing each film properly prevents not only water solubility but also blocking under high temperature atmosphere like in summer. When heat press laminating and heat sealing with the water soluble composite film in this invention, the above laminating and heat sealing can be conducted within the scope of temperature between 70° and 100° C., because the melting point of the above water soluble high molecular compound is low (about 55° to 60° C.). Therefore, excellent water solubilities can be retained without causing insolubilities of the PVA film. In addition, plasticizer (for example, glyceline and low molecular weight polyethylene glycol), which is used to plasticize the PVA film and is contained therein, do not exude and penetrate into the space between the layers.

EFFECTS OF THE INVENTION

As aforementioned, the water soluble composite films in this invention comprise PVA films and the special films mainly made of the specific water soluble high molecular compound composed of the repetitive unit represented as the above general formula (1), wherein the special films are layered and laminated into the PVA films. Since this composite film is superior in transparency and also superior in heat fusibility at a low temperature, heat seal is realized at a low temperature by heat sealing with the special film toward heat sealing side and heat insolubilities and the like of PVA films are not caused. As a result, insolubilities of PVA film are not caused and also superior water solubility can be realized, for example, excellent water solubility works even after being laminated. Further, since the above special films are superior in chemical resistance, when wrapping chemicals, the properties of the films themselves does not change only if the special films are faced inside. Furthermore, it is easy to manufacture the water soluble composite films in this invention by fusion coating and the like of material resin of the above special films on the PVA films. The composite film comprises two-layer structure with the PVA film, which prevents adhesion of each special film in storage under high temperature atmosphere. This means excellent blocking resistance. Therefore, the water soluble composite film is optimum as a package material for disposable daily commodities such as bactericide, insecticide, dyestuff, pesticide, a laundry bag, sanitary goods and the like.

The following examples and comparative examples are further illustrative of the present invention.

EXAMPLE 1

2.4 parts of dimethyl sebacic acid was added in 100 parts of polyethylene glycol (ethylene oxide: 100% by weight, molecular weight: 10,000) wherein ethylene oxide is solely addition polymerized to ethylene glycol, and transesterificat ion was conducted to obtain water soluble high molecular compound whose molecular weight is 150,000. ( A, X, $R_2$ of the repetitive unit as represented as the above general formula (1) is as follows.)

A: $-(CH_2CH_2O)-$

X: $-OCH_2CH_2O-$ $R_2$: $-CO(CH_2)_8CO-$

A water soluble high molecular film in 30µ thick was produced by fusion extruding the water soluble high molecular compound obtained in the above at 120° C. On the other hand, the PVA film in 10µ thick was produced by adding 5 parts of glycerin into 100 parts of partially saponified PVA at a molecular weight of about 87,000 and saponification of 88%, and casting the mixture as a homogeneous water solution on the film of polyethylene terephthalate (abbreviated as PET hereinafter). The above water soluble high molecular film and the PVA film were layered between two sheets of mold-releasing paper and maintained under the condition of 70° C. and 0.2 kg/cm² with hot pressing for three minutes so that the water soluble composite film of two-layer structure in 40µ was obtained.

EXAMPLE 2

The water soluble high molecular compound (molecular weight: 170,000) was obtained by reacting 100 parts of polyethylene polypropylene glycol (ethylene oxide: 85% by weight, polypropylene oxide: 15% by weight, molecular weight: 20,000) obtained by addition polymerizing propylene oxide in propylene glycol in a conventional method, and subsequently addition polymerizing ethylene oxide therein, with 1.1 parts of diphenylmehthanediisocyanate added for reaction at a temperature of 85° to 90° C. for 90 minutes. [In the repetitive unit represented as the above general formula (1), A, X and R₂ are as follows.]

A: a unit composed of repetition of

-(CH₂CH₂O)- and $$\mathrm{-(CH_2\overset{\overset{\displaystyle CH_3}{|}}{C}HO)-}$$

X: —OCH₂CHCH₃O—

R₂: —NHCO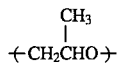CH₂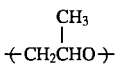NHCO—

Phenol series thermostable agent was added, so as to account for 0.2% by weight to the whole, in the water soluble high molecular compound thus obtained. This water soluble high molecular compound was employed to produce a water soluble high molecular film in 30µ thick by fusion extrusion at 120 ° C. On the other hand, a PVA film in 10µ thick was obtained in the same method as EXAMPLE 1. Then, a PVA film of two-layer structure in 40µ thick was obtained in the same method and condition as those of EXAMPLE 1.

EXAMPLE 3

1.1 parts of dimethyl phtahlate was added in 100 parts of polyethylene polypropylene glycol (ethylen oxide: 75% by weight, propylene oxide: 25% by weight, molecular weight: 20,000) obtained in the same way as EXAMPLE 2, to be reacted at temperature of 85° to 90° C. for 90 minutes so that the water soluble high molecular compound in molecular weight of 150,000 was obtained. [In the repetitive unit represented as the above general formula (1), A, X and R₂ are as follows.]

A: a unit composed of repetition of

-(CH₂CH₂O)- an $$\mathrm{-(CH_2\overset{\overset{\displaystyle CH_3}{|}}{C}HO)-}$$

X: —OCH₂CHCH₃O—

R₂: —COC₆H₄CO—

This water soluble high molecular compound was employed to produce a water soluble high molecular film at 30µ by fusion extrusion at 120° C. On the other hand, a PVA film in 10µ was manufactured by adding 5 parts of glycerin in parts of partially saponified PVA wherein the molecular weight is about 87,000 and saponification is 88% and casting the mixture as a homogeneous water solution on a PET film. A water soluble composite film of two-layer structure in 40µ thick was obtained by layering the PVA film between two pieces of mold-releasing paper and maintaining it under the condition of 70° C. with hot pressing and 0.2 kg/cm₂.

EXAMPLE 4

100 ppm of dibutyltindilaurate was added as a catalyzer in 100 parts of polyethylene polypropylene glycol (ethylene oxide: 75% by weight, propylene oxide: 25% by weight, molecular weight: 20,000) manufactured in the same way as EXAMPLE 2, and furthermore, 0.75 part of hexametylene diisocyanate was added therein for reaction at 90° C. for 120 minutes so as to obtain a water soluble high molecular compound whose molecular weight was 150,000. [In the repetitive unit represented as the above general formula (1), A, X and R₂ are as follows.]

A: a unit composed of repetition of

-(CH₂CH₂O)- an $$\mathrm{-(CH_2\overset{\overset{\displaystyle CH_3}{|}}{C}HO)-}$$

X: —OCH₂CHCH₃O—

R₂: —NHCO(CH₂)₆NHCO—

This water soluble high molecular compound was employed to produce a water soluble high molecular film in 30µ by solution extrusion at 120° C., On the other hand, a PVA film in 10µ was produced in the same method as EXAMPLE 1. A water soluble high molecular film of two-layer structure in 40µ was obtained in the same method and condition as EXAMPLE 1.

COMPARATIVE EXAMPLE 1

PEO (molecular weight: 130,000) was employed to produce a PEO film in 20µ thick by casting method. Two pieces of this film was put on top the other and laminated with heat pressing in the same way as EXAMPLE 1, so that a PEO single layer film in 40µ thick was obtained.

COMPARATIVE EXAMPLE 2

A PVA film in 20µ was obtained by casting water solution obtained by adding 5% by weight of glycerin as a plasticizer in PVA (molecular weight: 87,000, saponification: 88%). Two pieces of this film were put on top the other and heat pressed at 170° C. at 0.2 kg/cm² for three minutes to obtain a single-layer PVA film in 40µ thick in accordance with EXAMPLE 1.

The properties (tensile strength, tensile elongation and tear strength) of each film thus obtained in the above EXAMPLES and COMPARATIVE EXAMPLES were measured. Furthermore, water solubility, heat seal property, storage stability, transparency, bending strength and flex cracking strength of each film were measured and valued. In addition, the methods of the above measurement and evaluation are in accordance with the following.

[film property]

Film property was measured by conducting tensile test in accordance with JIS K 7127 and JIS K 7128 on each film maintained under 20×65% RH for 72 hours.

[water solubility]

Two sheets were put top the other with PVA films (in EXAMPLES) outside and its three sides were heat sealed to produce a seal bag in size of 15×20 cm. A detergent (350 g) whose bulk density (abbreviated as BD hereinafter) is 0.5 was filled into the seal bag and its opening was heat sealed. The bag filled with a detergent was dropped into a bucket of 30 cm in depth and 27 cm in diameter filled with 15 liters of water (water temperature was 15° C.) from 5 cm higher over the bucket. The time till the bag was broken and the detergent was leaked was measured.

[heat seal property]

Two sheets (1×5 cm) of each film were prepared and put top the other with PVA film (in EXAMPLES) outside, whose both ends were heat sealed at 70° C. and 1 kg/cm²G with heat seal tester. The part heat sealed was pulled from both ends. Those which were not broken were valued as good and those which were broken were valued as not good (Test ①). Further, PVA single-layer film of COMPARATIVE EXAMPLE 2 was heat sealed at 70° C. and 1 Kg/cm²G. In addition, the part heat sealed was cut away to be dissolved into water and the solubility was valued by visual observation. Those which are easily dissolved were valued as ○ and those which are not easily dissolved were valued as X (Test ②).

Storage Stability

Two pieces of bags same as those in the above evaluation test of water solubility were put top the other in an oven of 50° C.×80% RH and had been left as it is for 10 days. The presence of adhesion of each film was identified.

[transparency]

Each film was measured in accordance with JIS K 7105 and expressed as haze value.

[flex cracking strength]

Each film was folded double from its center with PVA film (in EXAMPLES) outside and its fold was pinched by plastic plates to be fixed and had been left under condition of 20° C.×65% RH for a week. One week later, the presence of rupture at a fold was valued by visual observation.

TABLE 1

|  |  | EXAMPLE |  |  |  |
|---|---|---|---|---|---|
|  |  | 1 | 2 | 3 | 4 |
| Water soluble high molecular film | Molecular weight | 150,000 | 170,000 | 150,000 | 150,000 |
|  | Thickness (μ) | 30 | 30 | 30 | 30 |
| PVA film thickness (μ) |  | 10 | 10 | 10 | 10 |
| Film properties |  |  |  |  |  |
| Tensile strength (kg/cm₂) |  | 205 | 211 | 210 | 215 |
| Tensile elongation (%) |  | 430 | 440 | 430 | 450 |
| Tear strength (kg/cm) |  | 110 | 80 | 90 | 120 |
| Water solubility (seconds) |  | 73 | 70 | 78 | 75 |
| Heat seal property |  |  |  |  |  |
| Test ① |  | good | good | good | good |
| Test ② |  | ○ | ○ | ○ | ○ |
| Storage stability |  | no adhesion | no adhesion | no adhesion | no adhesion |
| Transparency (%) |  | 22 | 25 | 27 | 27 |
| Flex cracking strength |  | no rupture | no rupture | no rupture | no rupture |

TABLE 2

|  | COMPARATIVE EXAMPLE | |
|---|---|---|
|  | 1 | 2 |
| Single film thickness (μ)* | 40 | 40 |
| Film properties |  |  |
| Tensile strength (kg/cm₂) | 85 | 230 |
| Tensile elongation (%) | 40 | 330 |
| Tear strength (kg/cm) | 35 | 106 |
| Water solubility (seconds) | 72 | 105 |
| Heat seal property |  |  |
| Test ① | not good | good |
| Test ② | ○ | X |
| Storage stability | adhesion occurred | no adhesion |
| Transparency (%) | 55 | 40 |
| Flex cracking strength | rupture occurred | no rupture |

*(NB): Single film thickness means PEO single film thickness in Comparative example 1, while it means PVA single film thickness in Comparative example 2.

From results of the above Table 1 and 2, it is found out that all examples were superior in film properties and water solubilitiy. Further, they were good at heat seal property and no adhesion was not seen in storage stability test. Furthermore, they were high in transparency and no rupture was not seen in flex cracking. On the other hand, it is found out that comparative example 1 was very low in film properties and evaluation results of storage stability, transparency and flex cracking strength were bad. In addition, comparative example 2 is inferior in water solubility and insolubilities were formed on heat seal part.

What is claimed is:

1. Water soluble composite film comprising a polyvinyl alcohol resin film laminated on a layer of a water soluble compound composed of a repetitive unit of the general formula (1):

$$-(A-X-A-R_2)- \quad (1)$$

wherein, A is a unit composed of a repetition of $-(CH_2CH_2O)-$ an $$-(CH_2\overset{R_1}{\underset{|}{C}}HO)-,$$

provided that the unit $-(CH_2CH_2O)-$ exists at not less than 70% by weight in A, a repetitive number of $-(CH_2CH_2O)-$ is a positive number, and a repetitive number of $$-(CH_2\overset{R_1}{\underset{|}{C}}HO)-$$

is zero or a positive number, $R_1$ is a hydrocarbon group, X is an organic residue of an organic compound having two active hydrogen groups and $R_2$ is a dicarboxylate compound residue or a diisocyanate compound residue, and wherein the weight average molecular weight of $-A-X-A-$ is not less than 1,000.

2. The water soluble composite film according to claim 1 wherein said water soluble compound has a weight average molecular weight of not less than 50,000.

3. The water soluble composite film according to claim 1 wherein said water soluble compound composed of said repetitive units of the general formula (1) is formed by reacting the following compounds (A) and (B):

(A) Polyoxy alkylene polyol, whose weight average molecular weight is not less than 1,000, obtained by addition polymerizing alkylene oxide containing ethylene oxide at not less than 70% by weight to an organic compounds having two active hydrogen groups and (B) at least one compound selected from the group consisting of dicarboxylate compounds and diisocyanate compound.

4. The water soluble composite film according to claim 3 wherein said water soluble compound has a weight average molecular weight of not less than 50,000.

* * * * *